July 22, 1947. F. T. BAILEY 2,424,298
REVERSE CURRENT CIRCUIT PROTECTION
Filed Sept. 10, 1943

WITNESSES:
Alia P Howell
F. V. Giolma

INVENTOR
Francis T. Bailey.
BY
Crawford
ATTORNEY

Patented July 22, 1947

2,424,298

UNITED STATES PATENT OFFICE 2,424,298

REVERSE CURRENT CIRCUIT PROTECTION

Francis T. Bailey, Pittsburgh, Pa., assignor to Westinghouse Electric Corporation, East Pittsburgh, Pa., a corporation of Pennsylvania Application September 10, 1943, Serial No. 501,799

8 Claims. (Cl. 175—294)

My invention relates, generally, to control systems and it has reference, in particular, to control systems for circuit breakers.

Generally stated, it is an object of my invention to provide a circuit breaker control system which is simple and inexpensive to manufacture, and is easy to install and maintain.

More specifically, it is an object of my invention to provide for opening a circuit breaker promptly in response to a reversal of the flow of current from the power source to the load circuit in a power system.

It is an important object of my invention to provide an electronic reverse current control system for a circuit breaker which is responsive to a predetermined decrease in, and/or reversal of the direction of flow of current.

Another object of my invention is to provide a high speed control system for tripping a circuit breaker in response to a reverse flow of current between a power source and a load circuit.

Yet another object of my invention is to provide a sensitive reverse current protective control system for operating a circuit breaker by controlling the bias voltage on the control electrode of an electronic control device controlling the operation of the circuit breaker trip means in accordance with the direction of current flow between the source and the load circuit.

Yet another object of my invention is to provide a reverse current control system for a circuit breaker which fails safely if it should happen to fail.

Other objects will in part appear obvious, and will in part be described hereinafter.

In accordance with my invention an electrode controlled electric discharge valve is provided for controlling the operation of an auxiliary control relay which effects energization of the trip circuit of a circuit breaker connecting a generator or other source to a load circuit. A control voltage from a shunt connected between the generator and the load circuit normally retains the valve conductive so as to prevent the control relay from energizing the trip circuit. When the direction of current flow reverses so does the control voltage, and the control relay becomes deenergized effecting energization of the trip circuit. Reclosure of the circuit breaker may be effected manually or by other suitable means.

Figure 1:
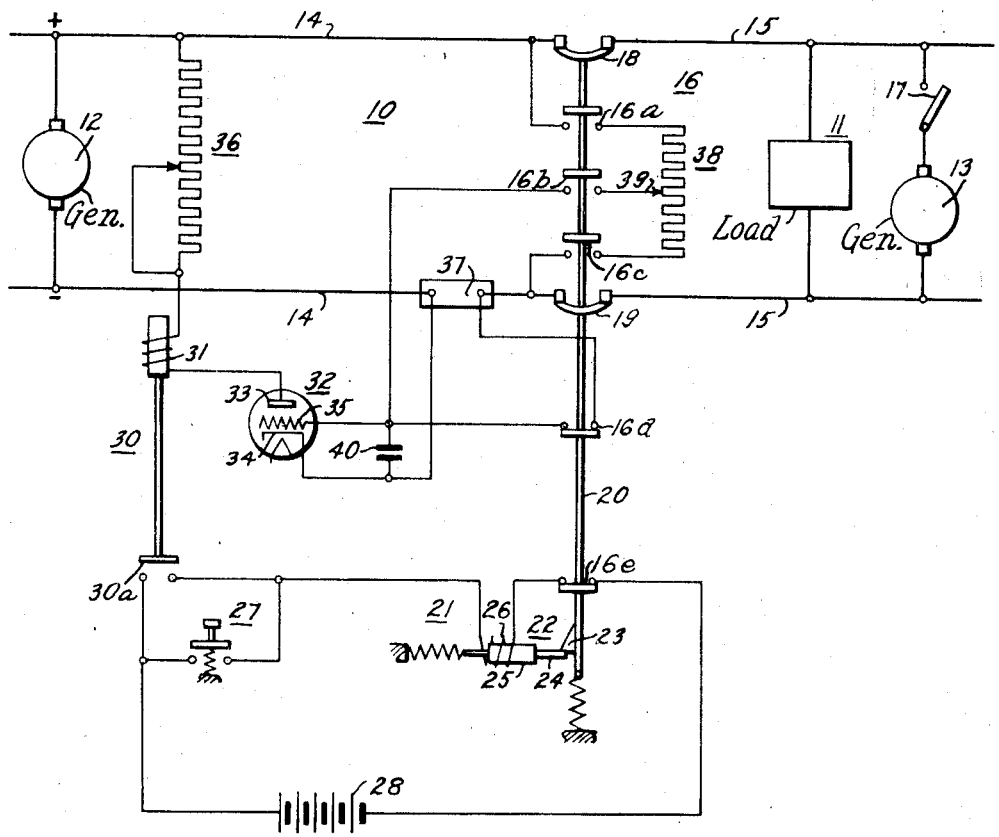
Figure 2:
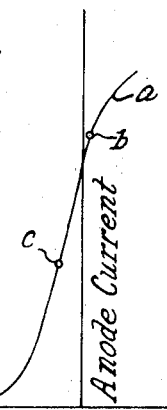

For a more complete understanding of the nature and scope of my invention, reference may be made to the following detailed description which may be studied in connection with the accompanying drawing, in which:

Figure 1 is a diagrammatic view of a power system embodying the principal features of the invention; and Figure 2 shows a curve illustrating the operating characteristics of one form of electronic valve device which may be used in practicing the invention.

Referring to Fig. 1, the reference numeral 10 may denote, generally, a power system wherein a load circuit including a load device 11 is disposed to be connected to a plurality of sources such as the generators 12 and 13, by means of conductors 14 and 15. A circuit breaker 16 may be provided for connecting the generator 12 to the load device. The generator 13 may be connected to the load device by suitable switch means 17 which is shown for purposes of illustration as a knife switch.

The circuit breaker 16 may be of any suitable type and may comprise main contact members 18 and 19 actuated by an operating member 20 which may be provided with suitable operating means (not shown), either manual or automatic, and of any type such as is well known in the art.

In order to provide for opening the circuit breaker, suitable trip means 21 may be provided for operating latch means 22 which normally retains the circuit breaker in the closed position. The latch means may comprise, for example, a suitable latch member 23 on the circuit breaker operating member 20 disposed for engagement with an interfering latch member 24. The trip means 21 may comprise an armature 25 for actuating the latch member 24 to disengage the latch member 23, and an operating winding 26. A push-button switch 27 may be provided for connecting the operating winding 26 of the trip means to a suitable current source, as the battery 28, for disengaging the latch members to open the circuit breaker.

In order to provide for operating the trip means 21 to open the circuit breaker in response to a reverse of current flow between the source or generator 12 and the load device 11, for any reason, such as the loss or reduction of voltage of the generator 12, means such as the control relay 30 having an operating winding 31 may be provided. The control relay 30 may be normally maintained in the energized or open position by means of an electric discharge device 32 having an anode 33, a cathode 34 and a control electrode 35, and which normally connects the operating winding 31 across the terminals of the generator 12 through a control resistor 36. A shunt 37 may be provided for normally applying a positive control bias voltage to the control electrode 35 of the discharge device 32 to maintain it conductive under normal operating conditions. When the direction of current flow between the generator 12 and the load device 11 reverses, so does the control voltage supplied by the shunt 37.

In order to render the discharge device 32 conductive when the circuit breaker 16 is open, a voltage divider 38 may be provided, having an adjustable tap 39 disposed to be connected to the control electrode 35. With a view to preventing interference in the operation of the discharge device 32 through the effects of the different sources of bias voltages, provision may be made for connecting the control electrode 35 to the different sources through auxiliary contact members of the circuit breaker 16. Additional auxiliary contact members may be provided on the circuit breaker 16 for disconnecting the voltage divider 38 from the source when it is not in use. A capacitor 40 may be connected between the control electrode 35 and the cathode 34 of the discharge device to insure the maintenance of the proper bias voltage during periods of transfer from one source to the other.

Referring to the characteristic curve a of Fig. 2, it will be seen that a relatively small change in the control voltage applied to the control electrode 35 of the discharge device produces a relatively large change in the plate current of the discharge device. The control relay 30 may, accordingly, be made to pick up at the value b for example, and drop out at the value c within the limits of the relatively small changes in control voltage such as may be caused by predetermined decreases in, or the reversal of the direction of the current flow between the generator 12 and the load device 11.

Under normal operating conditions with the circuit breaker 16 closed, as shown, the generator 12 supplies energy to the load device 11 through the main contact members 18 and 19, and the conductors 14 and 15. The voltage drop produced across the shunt 37 applies a positive bias voltage to the control electrode 35 through the auxiliary contact members 16d of the circuit breaker 16. The discharge device 32 is thereby rendered conductive, so that the control relay 30 is maintained in the operating position with contact members 30a open, and the trip means 21 remains deenergized.

Should the direction of current flow between the generator 12 and the load 11 reverse for any reason, the voltage drop across the shunt 37 reverses also. A negative bias voltage is thereby applied to the control electrode 35 which reduces the current through the operating winding 31 of the control relay 30 to a value less than the dropout value c of the relay. By properly selecting the operating values of current for the control relay 30, it may be made to operate upon a predetermined reduction of load current, or upon a reversal thereof only as desired. The control relay 30 returns to the deenergized position when the current through the discharge device 32 is reduced sufficiently, closing contact members 30a. An energizing circuit is thereby completed for the operating winding 26 of the trip means 21 through contact members 30a and 16e. The armature 25 is thereby actuated, so that the latch member 24 disengages the latch member 23, and the circuit breaker 16 opens, disconnecting the generator 12 from the conductors 15 and the load device 11.

When the circuit breaker 16 opens, auxiliary contact members 16a and 16c connect the voltage divider 38 across the terminals of the generator 12. A bias voltage is, therefore, applied from the adjustable tap 39 through auxiliary contact members 16b of the circuit breaker to the control electrode 35, which is disconnected from the shunt 37 by the opening of auxiliary contact members 16d. If the polarity of the generator 12 is correct and the terminal voltage is of the proper value, a sufficiently high bias voltage will be applied to the control electrode 35 to render the discharge device 32 sufficiently conductive to energize the control relay 30. Accordingly, the control relay 30 operates to the energized position, thus deenergizing the operating winding 26 of the trip means 21. The circuit breaker 16 may, therefore, be reclosed either manually or through other suitable means to reconnect the generator 12 to the conductors 15 and load device 11.

From the above description and the accompanying drawing, it will be apparent that I have provided in a simple and effective manner for controlling the operation of a circuit breaker in response to the reversal of current flow between a source and a load circuit in a power system or a predetermined decrease thereof. A sensitive and high speed control system may thus be provided which insures proper operation of the circuit breaker should the flow of current between the source and the load circuit reverse or decrease a predetermined amount for any reason. A control system embodying the features of my invention is both simple and inexpensive to manufacture and easy to maintain.

A control system embodying my invention will never fail to operate because of a faulty discharge device. If for any reason the device should fail the breaker is automatically tripped and cannot be reclosed until the fault is repaired.

Since certain changes may be made in the above description, and different embodiments of the invention may be made without departing from the spirit or scope thereof, it is intended that all the matter contained in the above description and shown in the accompanying drawing shall be considered as illustrative and not in a limiting sense.

I claim as my invention:

1. A control system for a circuit breaker connecting a load circuit to a direct current source in a power system comprising, relay means effective to provide for tripping of the circuit breaker, a normally conductive discharge device controlling the operation of the relay means to prevent tripping of the circuit breaker, said discharge device having a control electrode, circuit means providing a control voltage for the control electrode in accordance with the direction of current flow in the power system so as to provide for rendering the discharge device nonconductive and tripping the circuit breaker when the current reverses, and additional circuit means including normally open contact members of the circuit breaker for applying a control voltage to the control electrode in accordance with the source voltage for resetting the relay means so that the circuit breaker may be reclosed.

2. In a control system for a circuit breaker arranged to connect a power source to a load circuit, in combination, control means effective to trip the circuit breaker, means including a normally conductive discharge device rendering the control means ineffective, circuit means providing a control voltage in accordance with the direction of current flow between the source and the load circuit for rendering the discharge device nonconductive and rendering the control means effective to trip the circuit breaker when the current flows from the load circuit to the source, and circuit means including auxiliary circuit breaker contact means operable to supply a control voltage to the discharge device in accordance with the source voltage when the circuit breaker opens for rendering the discharge device conductive and the control means ineffective.

3. A power system comprising, switch means operable to connect a load circuit to a direct current source, trip means operable to open the switch means, means including a normally conductive discharge device for effecting operation of the trip means, said discharge device having a control electrode, circuit means applying a control voltage to the control electrode in accordance with the direction of current flow in the power system so as to render the discharge device nonconductive and effect operation of the trip means only when the current direction reverses, and circuit means including auxiliary contact means effective when the circuit breaker opens to apply a control voltage from the source to the control electrode when the circuit breaker opens to render the discharge device conductive and reset the trip means if the source polarity is correct.

4. The combination with a circuit breaker for connecting a load circuit to a power source, of control means operable to trip the circuit breaker, a normally conductive discharge device having a control electrode connected for effecting operation of the control means, circuit means including a shunt connected in series with the load circuit and the source for applying a control voltage to the control electrode in accordance with the value and/or direction of current flow to maintain the discharge device normally conductive and to effect operation of the control means when the current which normally flows from the source to the load circuit is reduced below a predetermined value, and contact means operated in accordance with the position of the circuit breaker to apply a control voltage derived from the source to the control electrode means only when the circuit breaker opens for resetting the control means.

5. In a control system for a circuit breaker connecting a load circuit to a direct current source and provided with a trip device, in combination, relay means for effecting operation of the trip device, a discharge device connecting the relay means to the source, said discharge device having a control electrode, means producing a bias voltage for the control electrode dependent only on the value and/or direction of current flow and positive when the direction of flow is normal, and auxiliary contact means operable only when the circuit breaker opens to connect the control electrode to an auxiliary source of bias voltage.

6. In a direct current power system having a circuit breaker for connecting a load circuit to a source, in combination, control means operable to trip the circuit breaker, means including a normally conductive electric discharge device operable to prevent operation of the control means, circuit means normally producing a control voltage for rendering the discharge device conductive and producing a voltage to render it nonconductive so as to operate the control means when the current flows from the load circuit to the load, and means disconnecting the circuit means from the discharge device when the circuit breaker opens and applying a control voltage from the source to render the device conductive when the source voltage is of normal polarity.

7. A control system for a switch device in a power system having trip means operable to open the device, comprising, relay means operable to effect energization of the trip means, an electronic valve having a control electrode for controlling the conductivity of the valve disposed to connect the relay means to a current source, circuit means associated with the power system for applying a bias voltage to the control electrode dependent on the direction of current flow therein so as to vary the conductivity of the valve means and effect operation of the relay means to energize the trip means when the current flow reverses in the power system, and additional circuit means for applying a bias voltage to the control electrode only when the circuit breaker is open.

8. A control system for a circuit breaker disposed to connect a load circuit to a direct current generator and provided with trip means operable to open the breaker comprising, a control relay operable in the deenergized position to effect energization of the trip means, a space discharge device having a control electrode for varying the conductivity thereof disposed to effect energization of the control relay from the generator, a shunt connected in series circuit relation with the load circuit and the generator for providing a bias voltage for the control electrode to render the discharge device normally conductive when the current flows from the generator to the load circuit and reduce its conductivity when it reverses, and circuit means including a voltage divider and auxiliary contact means responsive to opening of the circuit breaker for applying a positive bias voltage to the control electrode from the generator when the circuit breaker is open for energizing the control relay to deenergize the trip means as soon as the circuit breaker opens.

FRANCIS T. BAILEY.

REFERENCES CITED

The following references are of record in the file of this patent:

UNITED STATES PATENTS

| Number | Name | Date |
|---|---|---|
| 1,563,327 | Brackett | Dec. 1, 1925 |
| 1,787,299 | Alexanderson | Dec. 30, 1930 |
| 1,947,289 | Evans | Feb. 13, 1934 |
| 2,093,626 | Ward | Sept. 21, 1937 |
| 2,060,667 | Evans | Nov. 10, 1936 |
| 1,626,467 | Jones | Apr. 26, 1927 |
| 2,259,965 | Taliaferro | Oct. 21, 1941 |
| 1,371,523 | Slepian | Mar. 15, 1921 |
| 2,355,752 | Repking | Aug. 15, 1944 |
| 2,148,145 | Ward | Feb. 21, 1939 |
| 2,304,207 | Richardson et al. | Dec. 8, 1942 |